United States Patent [19]

Lecik et al.

[11] Patent Number: 5,422,492

[45] Date of Patent: Jun. 6, 1995

[54] CRITICALITY MONITORING SYSTEM CALIBRATION DEVICE

[75] Inventors: Barry S. Lecik, Altavista; Darryl L. Gordon, Lynchburg, both of Va.

[73] Assignee: The B&W Fuel Company, Lynchburg, Va.

[21] Appl. No.: 202,315

[22] Filed: Feb. 28, 1994

[51] Int. Cl.[6] ............................................. G21F 5/04
[52] U.S. Cl. ................................. 250/496.1; 250/252.1
[58] Field of Search ...................... 250/496.1, 252.1 R

[56] References Cited

U.S. PATENT DOCUMENTS 4,524,279  6/1985  Christianson et al. ............ 250/252.1

FOREIGN PATENT DOCUMENTS 3-13883  1/1991  Japan ............................ 250/252.1 R

*Primary Examiner*—Jack I. Berman
*Attorney, Agent, or Firm*—Daniel S. Kalka; Robert J. Edwards.

[57] ABSTRACT

A device for calibrating a criticality detector for a nuclear fuel manufacturing plant having a radiation source comprises a radiation protective holder for containing the radiation source. The holder is aligned with the criticality detector along an axis; and a measuring rod having a plurality of calibrations is connected to the criticality detector and positioned near the holder parallel with the axis. A nylon guide is connected to the holder and movably connected to the measuring rod for moving the holder and the radiation source along the axis for detection purposes while providing a calibration measurement.

6 Claims, 4 Drawing Sheets

CRITICALITY MONITORING SYSTEM CALIBRATION DEVICE

BACKGROUND OF THE INVENTION

1. Field of the Invention

The present invention relates, in general, to the monitoring of the criticality of nuclear fuel in fuel manufacturing or handling facilities, and in particular, to a new and useful device for calibrating a criticality detector.

2. Description of Related Art

In nuclear fuel manufacturing plants, criticality monitors and detectors are used to monitor the criticality of the nuclear fuel. To ensure correct operation, these systems have to be calibrated periodically in order to maintain proper adjustments to the electronics of the system. Presently, the calibration procedures for these criticality monitors are conducted by hand. This procedure includes having an operator attach a radiation source to a hand-held rod near the criticality detector and measure the distance from the detector to the radiation source with a tape measure.

In performing this calibration procedure by hand, the operator is usually required to stand on a ladder in order to remove the criticality detector or hold the radiation source for measuring. Not only is this procedure not very accurate for calibration purposes, but it is also hazardous to the operator due to the exposure to the radiation source, and his position on the ladder. Presently, there is no known device for calibrating a criticality detector which is accurate, safe to a user and cost efficient.

SUMMARY OF THE INVENTION

The present invention pertains to a calibrating device for a criticality monitoring system for a nuclear fuel manufacturing plant which allows for a more accurate, safe and cost-effective method of calibrating a criticality detector over known methods.

The present invention comprises a radiation protective holder for containing a radiation source which aligns the radiation source with the criticality detector. A measuring rod having a plurality of graduations or calibrations is aligned parallel with the axis of the holder. A nylon guide is connected to the holder and movably connected to the measuring rod for moving the holder and the radiation source along the axis for detection by the criticality detector. The nylon guide is aligned in the same horizontal plane as the radiation source for indicating a calibration measurement.

It is an object of the present invention to provide a calibration device for a criticality monitoring system for a nuclear fuel manufacturing plant which is accurate, safe to a user and cost-effective.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
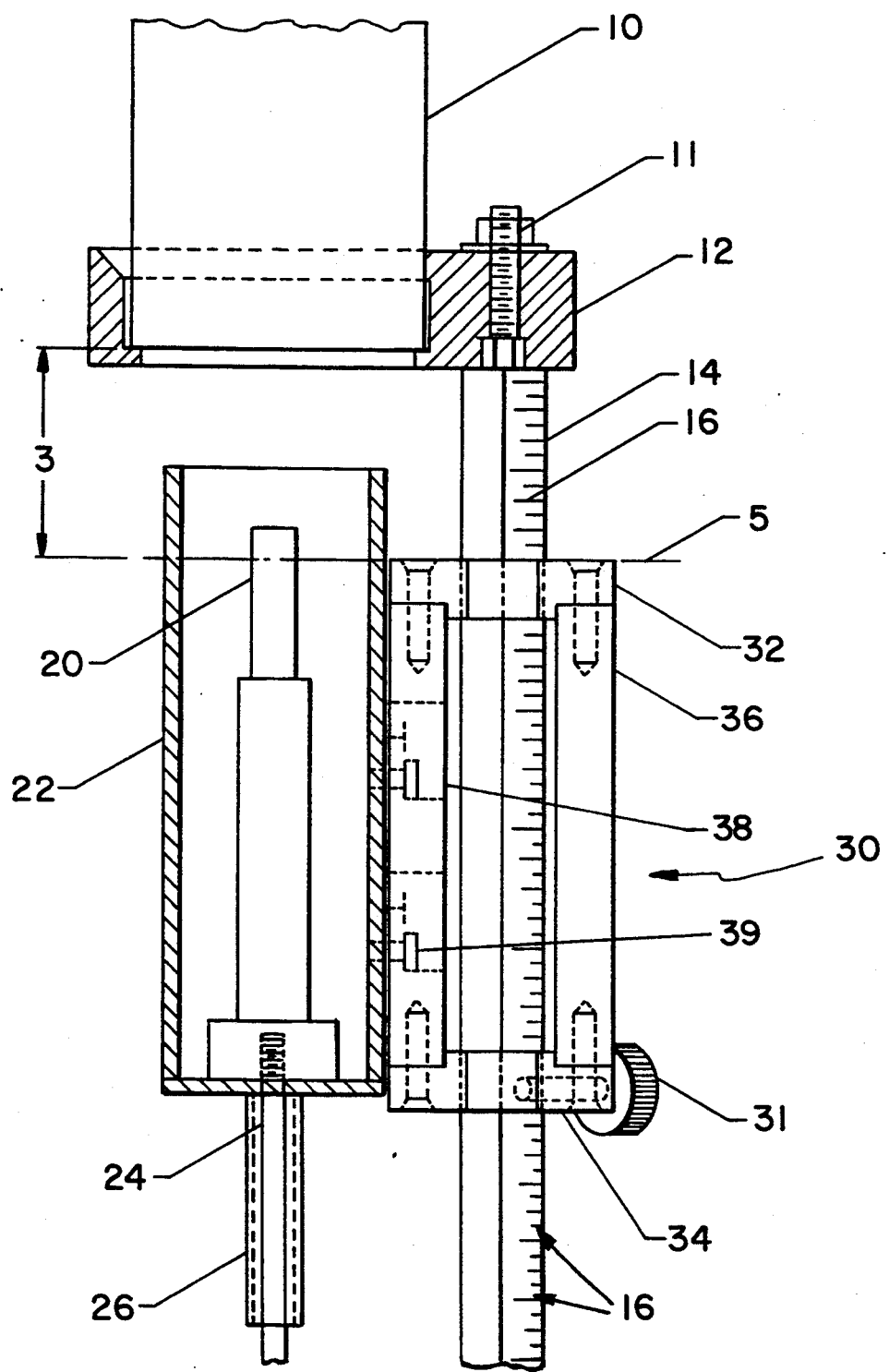
FIG. 1 is a schematic side view of the present invention.

The present invention pertains to the calibration of criticality detectors for nuclear fuel manufacturing plants. Referring to FIG. 1, the present invention is used in conjunction with a criticality detector 10. The present invention comprises a connector 12, which is an alignment fixture, within which the detector 10 is positioned during use. A steel measuring tube or rod 14 is connected to the connector 12. Rod 14 has a plurality of graduations or calibrations 16 marked on an outer surface.

A radiation protective holder or shield 22 is aligned directly beneath the detector 10 and contains a radiation source 20 which is provided by a radiation source extracting rod 24 movable within a guide tube 26 for providing the radiation source 20 within the shield 22.

Measuring rod 14 is aligned parallel with the axis of the radiation source 20.

A guide, generally designated 30, which is made of a nylon material, is movably connected to the measuring rod 14 and connected to the holder 22.

Guide 30 comprises an upper guide section 32 spaced apart from a lower guide section 34. Sections 32 and 34 are joined by connecting bars 36 and 38.

Figure 2:
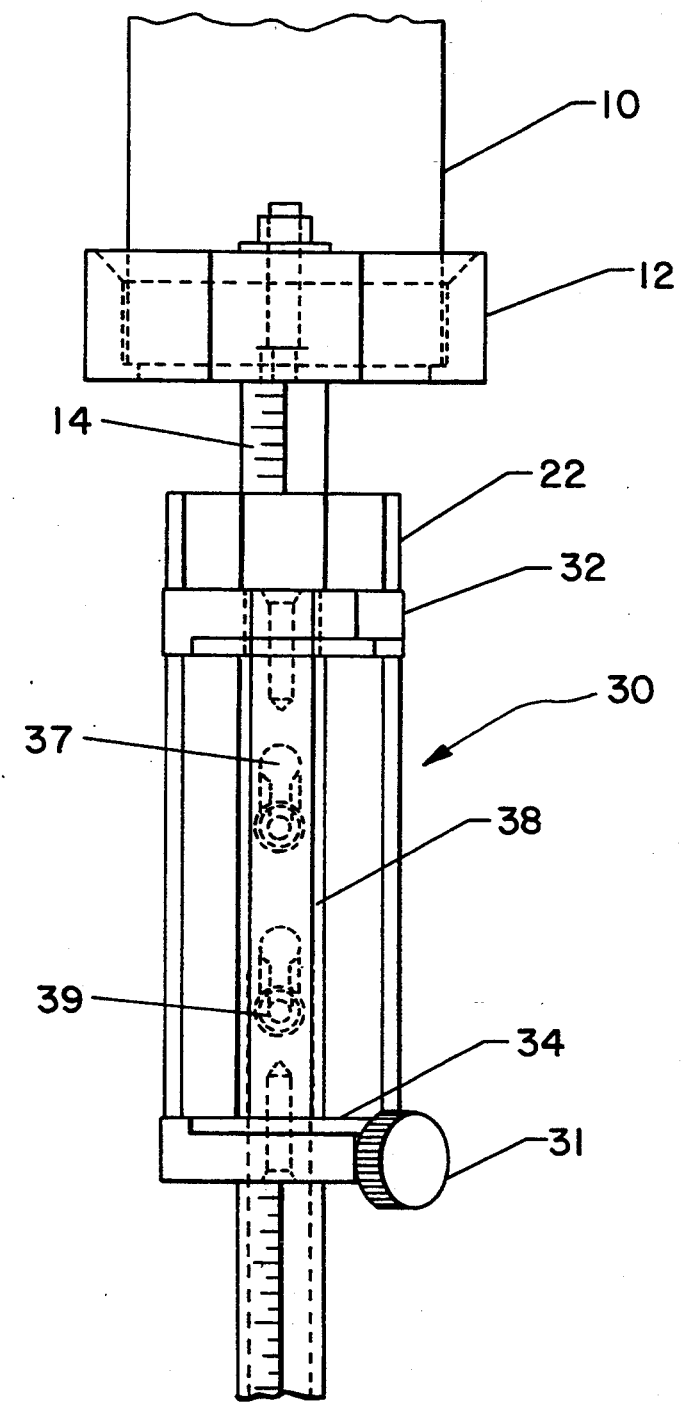
FIG. 2 is a schematic front view of the present invention.
Figure 3:
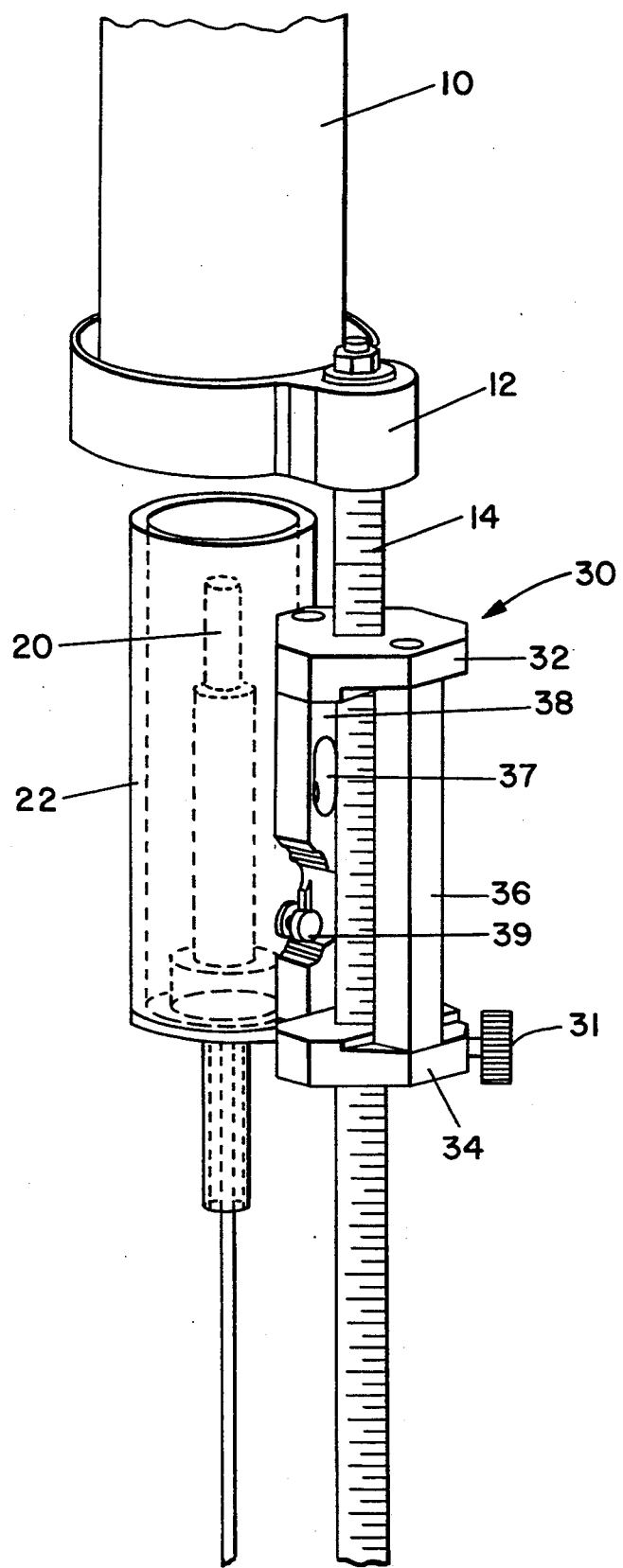
FIG. 3 is a perspective view of the present invention.

As shown in FIGS. 2 and 3, connecting bar 38 has key holes 37 bored therethrough for allowing a key hole mate or bolt 39 to connect connecting bar 38 to the radiation source holder 22.

A thumb screw and toggle pad device 31 is operatively connected with the guide 30 at the lower section 34 for moving the guide 30 and holder 22 with radiation source 20 along the measuring rod 14.

Upper section 32 of the guide 30 is aligned in the same horizontal plane as the radiation source 20 for providing a calibration measurement 3 which is indicated on the measuring rod 14 at 5.

As shown in FIG. 1, when the holder 22 is placed beneath the detector 10, the distance 3 between the source 20 and the detector 10 can be adjusted based on calibration requirements and source strength. At this time, with the present invention raised into position in order to maintain the proper radiation field at the detector 10, adjustments to the system electronics can be made as required.

Figure 4:
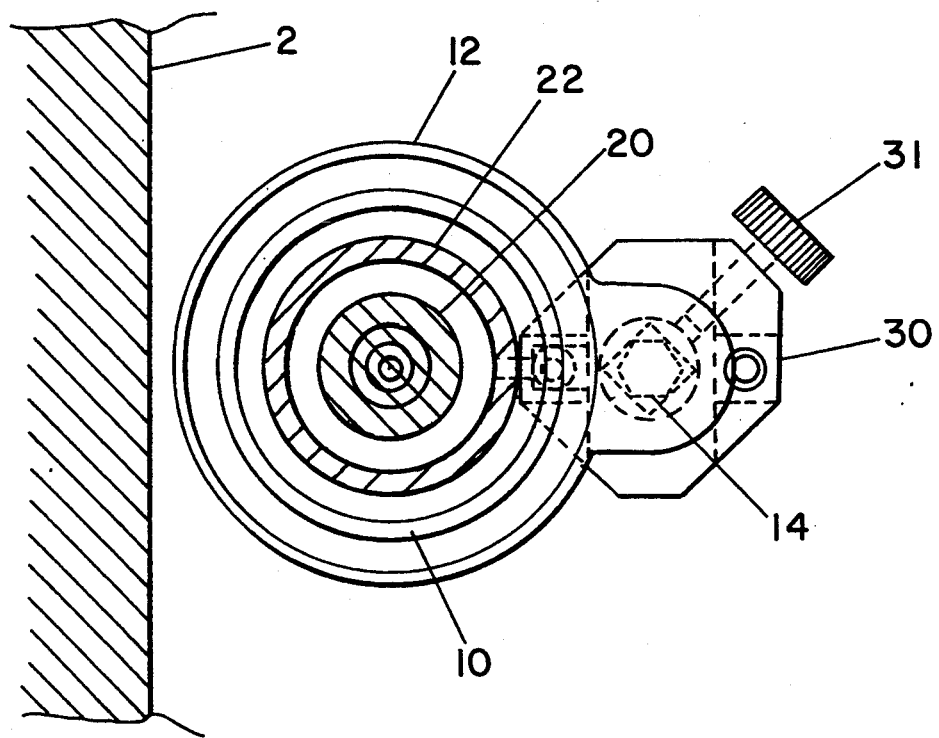
FIG. 4 is a schematic top view of the present invention.

FIG. 4 illustrates the present invention used in conjunction with a mounted detection system 10 and a wall 2. The present invention reduces the amount of radiation exposure to operating personnel. The present invention also eliminates the use of various tools which were previously used to calibrate detectors. The present invention provides for efficient savings in time by allowing the calibration to be performed while the detectors are in place, and therefore, mitigates the possibility of damage to the detectors during handling.

While specific embodiments of the invention have been shown and described in detail to illustrate the application of the principles of the invention, it will be understood that the invention may be embodied otherwise without departing from such principles.

What is claimed is:

1. A device for calibrating a criticality detector for a nuclear fuel manufacturing plant having a radiation source, the device comprising:

a radiation protective holder for containing the radiation source, the holder being aligned with the criticality detector along an axis;

measuring means connected to the criticality detector and positioned near the holder parallel with the axis; and guide means connected to the holder and movably connected to the measuring means for moving the holder and radiation source along the axis for being detected by the criticality detector and providing a calibration measurement for the measuring means.

2. The device according to claim 1, wherein the measuring means comprises a rod having a plurality of calibrations.

3. The device according to claim 2, wherein the guide means comprises an upper section spaced apart from a lower section, the upper section and the lower section being connected by a pair of spaced apart connecting bars, one connecting bar being connected to the holder.

4. The device according to claim 3, wherein the upper section is aligned in a horizontal plane with the radiation source.

5. The device according to claim 4, wherein the guide means further comprises a thumb screw.

6. The device according to claim 2, wherein the guide means is made of a nylon material.

* * * * *